(12) United States Patent
Roziere et al.

(10) Patent No.: US 6,608,311 B1
(45) Date of Patent: Aug. 19, 2003

(54) IMAGE SENSOR WITH INTEGRATED AMPLIFIERS FOR DATA ACQUISITION

(75) Inventors: Guy Roziere, Voreppe (FR); Bernard Munier, Seyssinet-Pariset (FR)

(73) Assignee: Thomson Tubes Electroniques, Meudon la Foret (FR)

(*) Notice: Subject to any disclaimer, the term of this patent is extended or adjusted under 35 U.S.C. 154(b) by 0 days.

(21) Appl. No.: 09/869,117

(22) PCT Filed: Dec. 21, 1999

(86) PCT No.: PCT/FR99/03237

§ 371 (c)(1),
(2), (4) Date: Jun. 25, 2001

(87) PCT Pub. No.: WO00/40008

PCT Pub. Date: Jul. 6, 2000

(30) Foreign Application Priority Data

Dec. 23, 1998 (FR) .............................. 98 16357

(51) Int. Cl.⁷ .............................. G01T 1/24; H04N 3/15
(52) U.S. Cl. .................. 250/370.09; 250/366; 250/369; 250/370.14
(58) Field of Search ....................... 250/370.09, 370.08, 250/370.11, 370.14, 366, 369, 370.01

(56) References Cited

U.S. PATENT DOCUMENTS

| 4,797,560 A | * | 1/1989 | Berger et al. ............... 348/309 |
| 5,057,682 A | | 10/1991 | Michon et al. |
| 5,120,950 A | | 6/1992 | Roziere et al. |
| 5,869,837 A | * | 2/1999 | Huang ................... 250/370.09 |
| 5,929,433 A | * | 7/1999 | Cluzel et al. ............ 250/208.1 |
| 5,962,856 A | * | 10/1999 | Zhao et al. ............ 250/370.09 |
| 6,021,173 A | * | 2/2000 | Brauers et al. ............ 378/98.8 |

FOREIGN PATENT DOCUMENTS

| EP | 0 818 921 | 1/1998 | |
| EP | 818921 A1 | * | 1/1998 | ............ H04N/3/15 |

\* cited by examiner

Primary Examiner—Albert Gagliardi
(74) Attorney, Agent, or Firm—Oblon, Spivak, McClelland, Maier & Neustadt, P.C.

(57) ABSTRACT

An image detector using arrays of photodiodes, and in particular to a radiological image detector. In the image detector, all the photodiodes of one and the same array are linked to adapter amplifiers embodied in the form of at least one integrated circuit. In each integrated circuit, an adapter amplifier, to which no photodiode is linked, delivers a voltage serving as a reference to define a bias voltage to be applied to the photodiodes. This arrangement makes it possible in particular to associate photosensitive arrays with amplifiers exhibiting different voltage thresholds.

9 Claims, 4 Drawing Sheets

IMAGE SENSOR WITH INTEGRATED AMPLIFIERS FOR DATA ACQUISITION

BACKGROUND OF THE INVENTION

1. Field of the Invention

The present invention relates to image detectors of the type using arrays of photosensitive sensors made from semiconductor materials. The invention applies in a particularly beneficial manner (but not exclusively) in the case of the detection of radiological images. Its aim is to facilitate the manufacture and to reduce the costs thereof, as well as to improve the stability of the measurements and the quality of the images obtained, in the case in particular of image detectors using a large number of photosensitive sensors.

2. Discussion of the Background

It is common practice to use arrays of sensors or photosensitive points made of semiconductor materials, in image acquisition techniques. The photosensitive points are made on semiconductor material, silicon for example, and they very often each comprise at least one photodiode. The photodiodes are sensitive in a band of wavelengths generally corresponding to visible radiation or near-visible radiation.

Depending on the applications for which they are intended, the photosensitive arrays may comprise highly variable numbers of pixels, that is to say of photosensitive points, from a few to several tens of thousands (and possibly as many as several millions of photosensitive points for dimensions of the order of for example 50 cm×50 cm).

One of the benefits of the images obtained with the aid of photosensitive points made of a semiconductor material lies in the fact that these images can be digitized, offering as advantages in particular ease of processing and of storage of the image. Of course, the advantages connected with images of digital type are just as important in the field of radiological image detection, and particularly in that of medical imaging using X-rays.

To apply photosensitive arrays such as described above to the detection of radiological images, it is well known to interpose a screen made of a scintillator substance between the X-ray radiation and each of the photosensitive points of the array. The scintillator substance is chosen so as to convert the X-ray radiation into light radiation, in the wavelength band to which the photosensitive points are sensitive.

According to one of the common operating modes, each photosensitive point comprises an element which functions as a switch, mounted in series with the photodiode. The line-by-line control of each of the switch elements (control effected after an exposure phase or integration phase, in the course of which the photodiode is exposed to a measurement light signal, that is to say to a signal corresponding to an image to be detected), makes it possible to transfer to a column electric charges produced by the corresponding photodiode during the integration phase; it should be noted that during the integration phase, the photodiode is fairly strongly reverse biased, so that it forms a capacitance in which the charges generated during this phase are stored.

Amplifiers and multiplexing circuits then make it possible to transfer the charges from the various photosensitive points to a readout and data processing circuit. An array each of whose photosensitive points comprises a photodiode cooperating with a switch element, as indicated above, is described together:with its operating mode in a French patent application No. 86.14.058 (publication No. 2,605, 166).

In the operating example mentioned above, the charges are stored, as and when they are generated, in the zone of the photodiode by which they were produced. According to another fairly common operating mode, both as regards X-ray imaging and imaging based on visible radiation, the charges are transferred as soon as they are produced, so as to be stored outside the zone of the photodiode, for example at the level of an amplifier catering for an integrator function. This configuration, which may be encountered for example in X-ray CT scanners, poses in particular various problems which the invention aims to solve. However, it should nevertheless be noted that the solutions proposed by the invention find application also in the operating modes mentioned above.

CT scanners are X-ray apparatus which generally use a single source of X-rays and a detector assembly which may comprise a large number of photosensitive points. The assembly formed by the source and the detector assembly can rotate and/or move in translation with respect to the body of a patient, with a view to forming the internal image of a slice of the patient. Such an apparatus is described for example in the document U.S. Pat. No. 5 592 523.

FIG. 1 diagrammatically and in a simplified manner represents some of the essential elements of a CT scanner. The CT scanner comprises a source 1 producing X-ray radiation 2, and a detector assembly 4. The X-ray radiation 2 irradiates a body 3 of a patient interposed between the source 1 and the detector device 4. The CT scanner rotates about an axis of rotation represented by a point 6. It may furthermore comprise an auxiliary detector 5, situated outside the X-ray field masked by the body 3. The detector device 4 has a length which extends according to an arc of a circle. The detector assembly 4 comprises a multitude of photosensitive detection points arranged along the length and the width of the detector device 4. The photosensitive points may be grouped together into detection modules MD.

A CT scanner can comprise for example up to several tens of detection modules, arranged side by side along the length of the detector device 4. Each detection module MD comprises a scintillator material 71 superimposed on a photosensitive array 72. The scintillator material has the function of converting the X-ray radiation into light radiation to which the photosensitive arrays are sensitive; the scintillator material is therefore situated on the source 1 side.

A photosensitive array 72 can comprise a grid of photodiodes (not represented in FIG. 1), arranged along for example 32 rows and 16 columns, i.e. 512 diodes in number. In certain applications such as those relating to CT scanners, each photodiode is linked to a data acquisition amplifier which has the function in particular of receiving and integrating the charges as and when they are produced by the photodiode; this integration of the charges achieves in a certain manner the storage of the charges which, in the other operating mode mentioned previously, is performed at the level of the photodiode itself, whereas in the present case this storage is performed outside the photosensitive array.

In fact in this configuration the amplifiers which receive the signals from the photodiodes are not made on the same substrate as these latter, these amplifiers may be located in proximity to the photosensitive array.

FIG. 2 diagrammatically represents a photosensitive array 7 similar to an array 72 of FIG. 1, and each photosensitive point of which is formed by a photodiode. To simplify the description only four photodiodes Dp1 to Dp4 are represented. In the example, they are arranged in two rows L1, L2, and two columns cl1, cl2. The photodiodes Dp1 to Dp4 are made on a substrate Sb1 and, as a constructional example, they are all linked electrically by one and the same end, their anode in the non-limiting example represented, to the said substrate and to ground.

The other end of each of the photodiodes, i.e. the cathode, is connected to an individual conductor 19, by way of which each of these cathodes is connected to a first input E1 of an amplifier a1 to a4 specific to each photodiode.

The amplifiers a1 to a4 are commonly constructed with the aid of operational amplifiers; however, it is also known practise to embody them as discrete components, with one or more transistors. These amplifiers intended for acquiring the data delivered by the photodiodes (in the form of electric charges), must meet very severe constraints: low noise, large dynamic range and high stability for the reproduction of the measurements.

In the conventional example represented, each first input E1 in fact corresponds to the "−" inverting input of the operational amplifier a1 to a4.

A so-called integration capacitance Ci is linked between the first input and an output S1 of each amplifier a1 to a4. A first switch element I1 (consisting for example of a transistor of the MOS type) is mounted in parallel with each integration capacitance Ci. A second input Ep of the amplifiers a1 to a4 (corresponding to the "+" noninverting input of the amplifier), called the "drive input", receives a voltage called the drive voltage VP1, which in the example is developed with respect to ground.

The application of the drive voltage VP1 to a drive input Ep has the effect of establishing on the first electrode E1 a voltage which constitutes the bias voltage VP of the photodiodes Dp1 to Dp4. The value of the bias voltage VP is therefore dependent on the value of the drive voltage VP1 whose variations it follows, and to which it more or less closely approximates depending in particular on the nature and the qualities of the amplifier. This shows that each of the amplifiers used to receive the charges delivered by photodiodes Dp1 to Dp4 must comprise, in addition to the input E1 linked to the photodiode, another input such as the drive input Ep so as to receive the drive voltage VP from which the bias potential VP present on the first input E1 stems.

The output S1 of each of the amplifiers a1 to a4 is linked to a second switch element I2, whose other side is linked to a so-called storage capacitance Cs. The other plate of the storage capacitance Cs is linked in the example to ground.

Various other means are also linked to the storage capacitances Cs, which make it possible in particular to transfer the charges to multiplexing and data processing circuits, but these means are not described further since they depart from the field of the invention and are known per se. In fact, the region directly concerned by the invention stops at the output S1 of the amplifiers a1 to a4.

During the exposure or integration phase, the first and second switches I1, I2 are open, and the charges delivered by the photodiodes Dp1 to Dp4 ate integrated in the corresponding amplifier a1 to a4. In a following phase, the second switches I2 are closed, and the quantities of charge integrated by the amplifiers during the integration phase are transferred to the storage capacitances Cs; when this transfer is effected the second switches I2 are placed in the open state, then the first switches I1 are closed for a short instant so as to discharge the integration capacitances Ci and allow a new cycle.

For correct operation of the photodiodes Dp1 to Dp4 in the integration phases, during which phases they deliver charges whose quantity is dependent on the intensity of the light signal to which they are exposed, the bias voltage applied to these photodiodes must generally lie between 0 volt (zero) and a reverse bias value of 20 mV. This bias must be stable and applied equally to all the photodiodes, if the quality of the measurements and their stability is not to be seriously impaired.

In the case of apparatus which use a lowish number of photodiodes, a few tens for example, it may be acceptable to process the signals delivered by these photodiodes by using an individual channel for each, and by making any adaptations required for the proper operation of each channel: for example by adjusting for each amplifier the value of the drive voltage which it receives, so that each photodiode is correctly biased.

However, in the case of arrays which may comprise several hundreds of photodiodes, this method is no longer suitable and the integration of the amplifiers such as a1 to a4 becomes necessary, as regards ease of manufacture, bulkiness, heat dissipation and overall cost. Such integration unfortunately poses problems regarding its compatibility with the photosensitive array: specifically, if one no longer resorts to individual processing channels, it becomes more difficult to use for example operational amplifiers for reasons in particular of differences of voltage threshold, as is further explained in the subsequent description.

It should be noted that we intend the term "integration" to imply the use (and possibly the embodying) of an integrated circuit containing in a manner which is conventional per se, at least all the components required to form, on one and the same substrate, what could become a relatively sizeable number of amplifiers such as a1 to a4, numbering 61, 128, 256 or 512 or more for example.

It should also be noted that the amplifiers a1 to a4 fulfil several functions including that of amplifier, plus that of integrator, and plus that which consists in applying one of the potentials of the bias voltage VP to one of the ends of the photodiode linked thereto. Also, these amplifiers are called adapter amplifiers a1 to a4 in the subsequent description.

The fact that the photodiodes Dp1 to Dp4 are embodied on a substrate and that the adapter amplifiers a1 to a4 are on another substrate, poses a difficulty as regards stability in relation to temperature variations, since the thermal drifts in this case may be very different and may be injurious. Specifically, the threshold voltage of a transistor varies fairly strongly with temperature, and tends therefore to modify the difference between the voltage values present for example on the first inputs E1 and the drive inputs Ep of the adapter amplifiers a1 to a4.

Moreover, it is known that integrated circuits originating from different manufacturing batches have different operating voltages. In this case they impose different bias voltages on the photodiodes associated with them.

It is known practise to use amplifiers of differential type (thermal drift of less than 20 $\mu$V/°C.) when seeking low thermal drift and good stability in general. From this standpoint, differential amplifiers could therefore constitute the sought-after integrated amplifiers, but in the case of the present application, this type of amplifier may be inadvisable owing in particular to the fact that its input stage requires two transistors, and that it thus tends to raise the noise by a relatively sizeable factor $\sqrt{2}$ (square root of two). Furthermore, an amplifier of this type uses twice the area of silicon, thereby tending to increase its bulk and its cost.

Another solution (favourable to low noise) can also consist in using an adapter amplifier which uses just one input transistor.

FIG. 3 represents the diagram of an amplifier a' capable of fulfilling the functions catered for by the adapter amplifiers a1 to a4 of FIG. 2.

The amplifier a' comprises three MOS type transistors, Q1, Q2, Q3. The transistors Q1 and Q2 form a well-known cascode type transconductance amplifier. The transistor Q1 can comprise a large area which endows it with low voltage noise on its gate G. This gate G of Q1 is linked to the source S of the third transistor Q3 and this point forms an input E of the amplifier a'; this input E with respect to the amplifiers a1 to a4 shown in FIG. 2, represents the "−" inverting input and therefore represents a first input such as E1 to which a photodiode Dp (represented dotted) is to be linked. The drain D of Q1 is linked to the source S of the transistor Q2 whose gate G is held at a fixed voltage VF, and whose drain D is linked on the one hand to a supply voltage V+ by way of a current generator Gi, and on the other hand to the gate G of the third transistor Q3. The drain D of Q3 receives one end of an integration capacitance Ci' whose other end is linked to the supply voltage V+.

The capacitance Ci' integrates the currents and a switch I1' arranged in parallel with the capacitance Ci' makes it possible to reset the latter's charge to zero periodically. The drain D of Q3 constitutes the output of the amplifier a' and corresponds to an output S1 of the amplifiers of FIG. 2 (this output would therefore have to be connected to a second switch I2 shown in FIG. 2). The source S of the first transistor Q1 constitutes a second input Ep of the amplifier a'; this input Ep corresponds to the "+" noninverting inputs of the amplifiers of FIG. 2, and it therefore constitutes a drive input intended for receiving a drive voltage VP1, so as to determine on the input E1 the bias voltage VP2.

Although it exhibits advantages in particular as regards noise, as compared with a differential amplifier, the amplifier diagram described above also poses problems, if it is chosen so as to be integrated as envisaged above. This amplifier is in fact subject to a considerable thermal drift of the order of 2 mV/°C. Moreover, when integrating this type of amplifier, discrepancies of from 0.1 volts to 0.2 volts are possible from one integrated circuit to another. Consequently, if several such integrated circuits are associated, each circuit will have its own threshold voltage. So, one seeks a bias voltage of the photodiodes of between 0 and 20 millivolts.

These explanations show that, although it is desirable, the integration mentioned above is especially difficult to implement.

SUMMARY OF THE INVENTION

The aim of the present invention is to solve the problems cited above, and in particular those related to one and the same bias for all the photodiodes used as well as to the maintaining of this bias over time, and hence to allow the integration of the elements useful in the acquisition of data of photosensitive arrays, and to permit the use of a wide selection of amplifier type.

For this purpose the invention provides for the making of adapter amplifiers made in the form of integrated circuits on one and the same substrate, and for the use of one of these integrated adapter amplifiers to obtain a potential acting as reference, so as to define the bias voltage of the photodiodes with respect to this reference potential.

This combination makes it possible to solve all or some of the problems posed, since in practise the amplifiers of one and the same integrated circuit have the same thermal variation to within a few fractions of an mV.

The invention therefore relates to an image detector, comprising at least one photodiode array, adapter amplifiers intended for receiving electric charges produced by the photodiodes, these charges being produced during a so-called integration phase during which the photodiodes are each biased by a bias voltage, the bias voltage being applied to each photodiode by way of an adapter amplifier, characterized on the one hand in that the adapter amplifiers are constructed as at least one integrated circuit, and in that it furthermore includes means for defining the bias voltage with respect to a reference potential tapped off from an adapter amplifier.

BRIEF DESCRIPTION OF THE DRAWINGS

The invention will be better understood on reading the description which follows, given by way of non-limiting example and with reference to the appended figures, among which.

DESCRIPTION OF THE PREFERRED EMBODIMENTS

Figure 2:
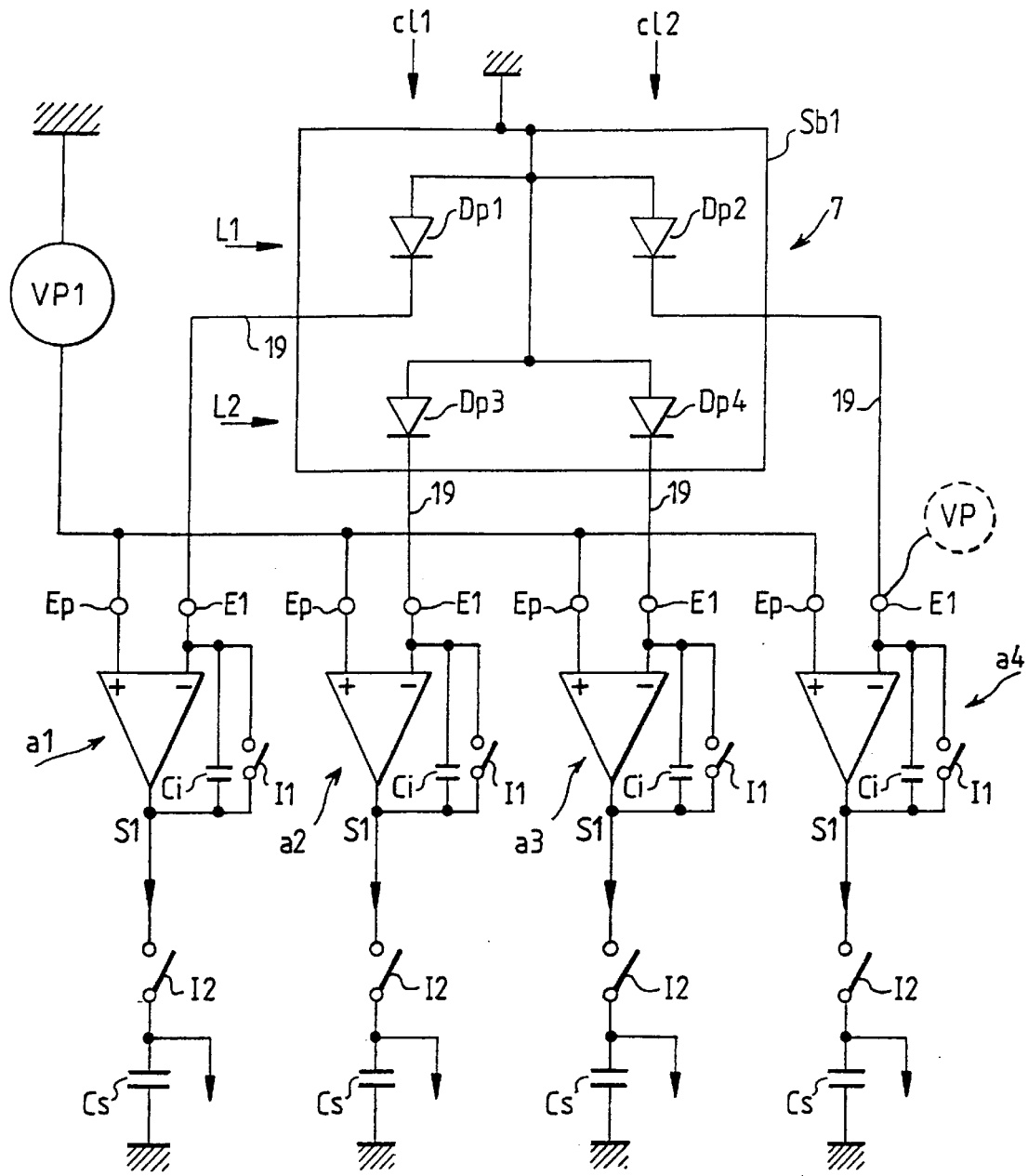
FIG. 2 diagrammatically represents a photodiode array and adapter amplifiers serving for the acquisition of the data delivered by the photodiodes, in a configuration of the prior art.
Figure 4:
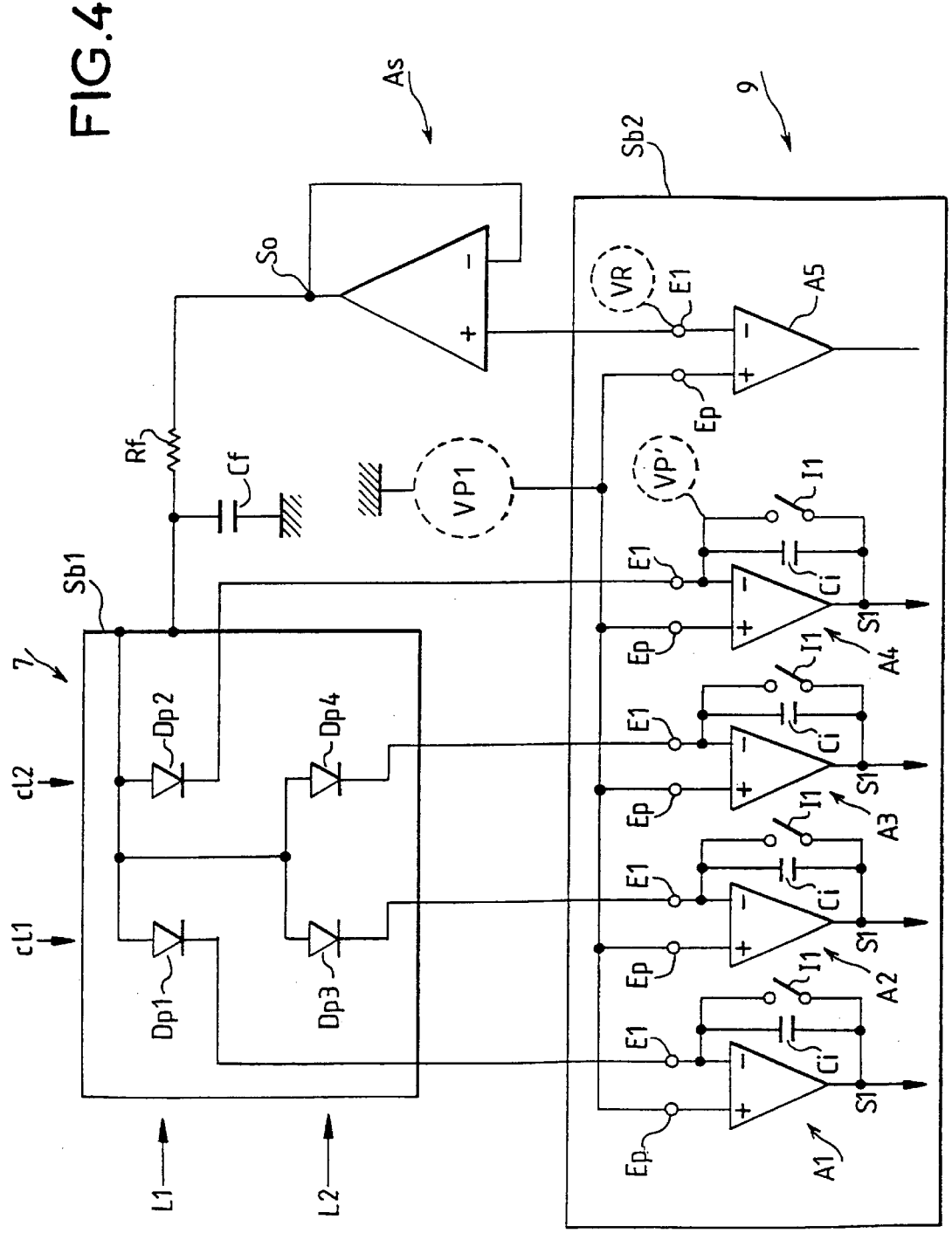
FIG. 4 diagrammatically shows a photodiode array and adapter amplifiers serving for the acquisition of data delivered by the photodiodes, in a first embodiment of the invention.

FIG. 4 represents a photosensitive array 7 which in the example is identical in structure to that of FIG. 2. It comprises photodiodes Dp1 to Dp4 formed on a substrate Sb1. In the non-limiting example described, all the anodes are linked together, by the substrate for example. As in the example in FIG. 2, the cathode of each of the photodiodes Dp1 to Dp4 is linked, outside the array 7, to a first input E1 of an adapter amplifier A1 to A4 to which it delivers the charges produced by the photodiode; these adapter amplifiers A1 to A4 are represented in FIG. 4 as operational amplifiers and they are for example similar to the adapter amplifiers a1 to a4 already described with reference to FIG. 2, and fulfil the same functions.

According to one characteristic of the invention, the adapter amplifiers A1 to A4 useful for the acquisition of the data of the photodiodes Dp1 to Dp4 are constructed as at least one integrated circuit 9, and consequently in the example of FIG. 4, they are formed on one and the same substrate Sb2.

The voltage called the drive voltage VP1, already mentioned, referenced with respect to ground for example, is applied to the second inputs or drive inputs Ep of the adapter amplifiers A1 to A4. As already explained earlier, this results in one of the potentials of the bias voltage VP being present on the first input E1, and therefore being connected to the cathodes of the photodiodes.

To apply the other potential of the bias voltage VP to the anodes of the photodiodes, in a first embodiment of the invention and according to another of its characteristics, an additional amplifier is used, that is to say in the example a fifth adapter amplifier A5. This amplifier A5 is identical in structure to the four adapter amplifiers A1 to A4 and it is made on the same substrate Sb2 as them, but no photodiode is linked to it. The drive input Ep of this additional amplifier A5 is linked likewise to the drive voltage VP1, and consequently its first input E1 is brought to the potential of the bias voltage VP in the same way as the other first inputs E1.

The potential present on the first input E1 of the additional amplifier A5 is regarded as a reference potential VR.

According to a novel characteristic of the invention, the reference potential VR is applied to an operational amplifier of a common type (known for example under the reference LM 308), operating as a follower amplifier As. The follower amplifier As reproduces at low impedance the reference potential VR which is applied to its input. The output So of the follower amplifier As is linked to the substrate Sb1 of the array 7 and hence to the anodes of the photodiodes Dp1 to Dp4, by way of a low-pass filter; the latter is formed in a conventional manner on the one hand by a resistor Rf inserted in series between the output So and the substrate Sb1 and on the other hand by a capacitance Cf connected between the ground and the substrate Sb1.

Under these conditions, the bias voltage VP is defined with respect to the reference potential VR since a potential which always remains very close to that of the reference potential VR is applied to the anodes of the photodiodes Dp1 to Dp4; the reference potential VR itself being very close to the potential applied to the cathodes of the photodiodes, it follows that the bias voltage VP is zero or very small, at all temperatures.

In this version of the invention, all the photodiodes Dp1 to Dp4 of the array 7 are linked to one and the same integrated circuit 9, and the latter must therefore in this case possess at least one more adapter amplifier than the number of photodiodes, so as to deliver the reference potential VR. Of course, the number of photodiodes included in the array 7 can differ from that represented, being smaller or bigger, for example several hundreds or several thousands, or even more. In this case the number of adapter amplifiers contained by the integrated circuit needs to be increased, this not modifying the general organization shown for example in FIG. 4.

It is indeed preferable in this version of the invention to associate the photodiodes of one and the same array with adapter amplifiers contained in one and the same integrated circuit, so as to avoid differences between the bias voltages delivered by various integrated circuits.

Figure 1:
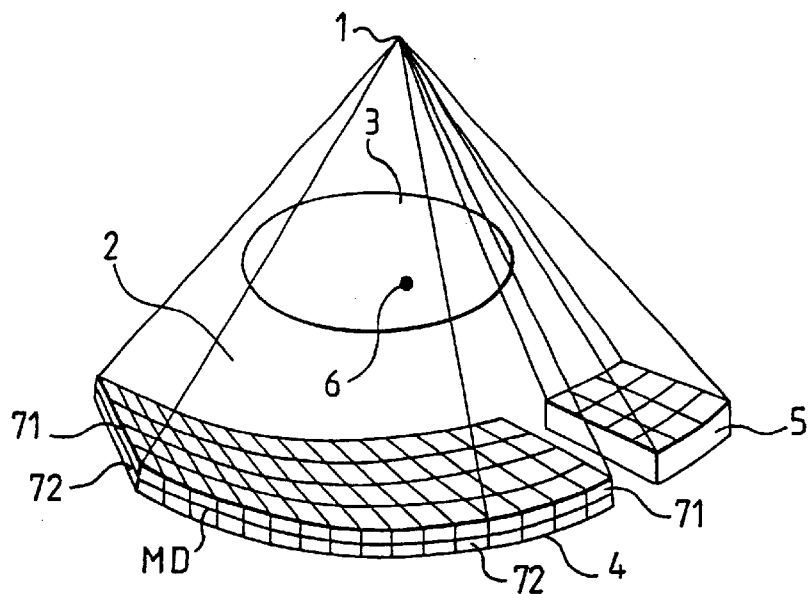
FIG. 1 diagrammatically represents a CT scanner.
Figure 3:
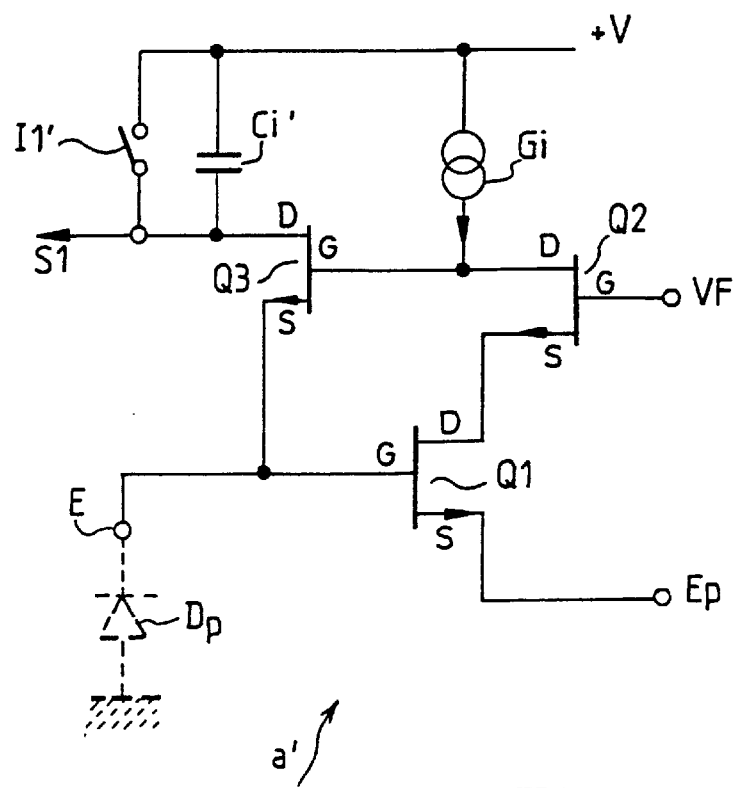
FIG. 3 diagrammatically represents a particular embodiment of an adapter amplifier represented in FIG. 2.

It should be noted that the adapter amplifiers A1 to A5 may advantageously consist of amplifiers of the type of the amplifier a represented in FIG. 3; this type of amplifier in fact exhibits favourable noise characteristics, has a drive input, and makes it possible to cater for all the functions fulfilled by the adapter amplifiers A1 to A5.

Figure 5:
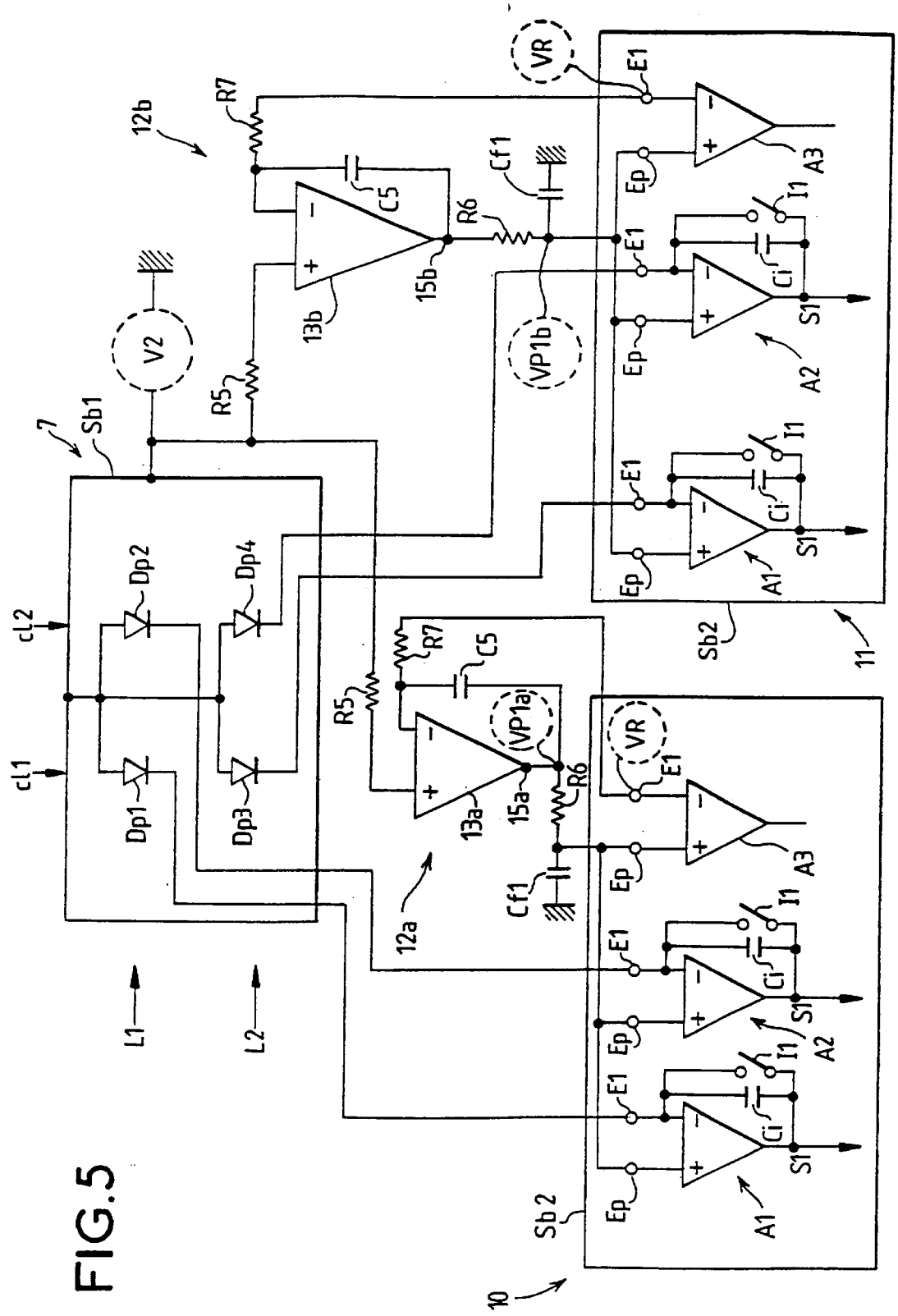
FIG. 5 diagrammatically shows a photodiode array and adapter amplifiers serving for the acquisition of data delivered by the photodiodes, in a second embodiment of the invention.

FIG. 5 represents a second embodiment of the invention, advantageous in particular in that it allows the use of several integrated circuits to read one and the same photodiode array.

The photosensitive array 7 shown in FIG. 5 is the same as that shown in FIG. 4, that is to say that in order to simplify the description it is represented with just four photodiodes Dp1 to Dp4. All the anodes of the photodiodes Dp1 to Dp4 are linked together by the substrate Sb1 for example.

In this version of the invention, the photodiodes are split into groups, that is to say certain of the photodiodes are associated with adapter amplifiers belonging to a first integrated circuit 10, and the other photodiodes are associated with adapter amplifiers belonging to a second integrated circuit 11. In the example represented: the two photodiodes Dp1, Dp2 of one and the same row L1 form a group and are linked by their cathode respectively to the first input E1 of a first and of a second adapter amplifier A1, A2, which are contained in the first integrated circuit 10; the two photodiodes Dp3, Dp4 of the other row L2 form a second group and are linked respectively to the first input E1 of a first and of a second adapter amplifier A1, A2, which are contained in the second integrated circuit 11.

The two integrated circuits 10, 11 may be constructed with adapter amplifiers of the same type, although this condition is not obligatory for proper operation. In the non-limiting example represented, each integrated circuit 10, 11 comprises three adapter amplifiers A1, A2, A3, the first A3 of which is the additional adapter amplifier intended for providing the reference potential VR present on its first input E1.

A fixed voltage V2 is applied to the substrate Sb1 of the array 7 and hence to the anodes of all the photodiodes Dp1 to Dp4, with a view to constituting one of the potentials of the bias voltage VP. According to the invention, the other potential of the bias voltage VP having the desired value with respect to the fixed voltage V2, is delivered to the cathodes by applying to the drive inputs Ep a drive voltage VP1a, VP1b formulated with the aid of a servo control using a comparator circuit 12a, 12b; a comparator circuit 12a is assigned to the integrated circuit 10, and a comparator circuit 12b is assigned to the integrated circuit 11. The bias voltage VP therefore corresponds to the potential difference between the voltage present on the first inputs E1 and that of the fixed voltage V2.

The comparator circuits 12a, 12b each comprise an operational amplifier 13a, 13b, respectively, for example an amplifier known commercially under the reference LM 308. Each operational amplifier 13a, 13b is mounted in a manner which is itself conventional, so as to constitute in particular a voltage comparator delivering a signal when it detects a difference between a first and a second voltage applied respectively to its first and to its second input "−" "+"; in this case, on its output 15a, 15b, it delivers a signal whose sign is dependent on the sense of the difference on its inputs.

In the non-limiting example described, the fixed voltage V2 applied to the substrate Sb1 of the array 7 is also applied to the "+" noninverting input of the two amplifiers 13a, 13b, by way of a resistor R5 (100 KΩ for example) for each. The drive inputs Ep of the integrated circuits are linked to the output 15a, 15b of the amplifier 13a, 13b which corresponds thereto, that is to say the output 15a for the first integrated circuit 10 and 15b for the second integrated circuit 11; this link is effected by a resistor R6 (for example 1000 Ω) which cooperates with a capacitor Cf1 (for example 1000 μF) to form a low-pass filter. The same holds for the first inputs E1 delivering reference voltages VR, of which that which belongs to the first integrated circuit 10 is linked to the "−" inverting input of the amplifier 13a, and that of the second integrated circuit 11 is linked to the "−" inverting input of the amplifier 13b, each by a resistance. R7 (equal to R5). Finally, for each amplifier 13a, 13b, the "−" inverting input is linked to the output 15a, 15b by a capacitor C5 with a value of for example 1 μF. The two amplifiers 13a, 13b are supplied in a standard manner with voltages (not represented).

When operating, each of the operational amplifiers 13a, 13b delivers a drive voltage VP1a, VP1b, applied to the drive inputs Ep of respectively the first and second integrated circuits 10, 11. Each of these drive voltages then possesses a value such that the reference voltage which it engenders, and which is applied to the "−" inverting input of the corresponding operational amplifier, have the same value as the voltage which is applied to the "+" noninverting input of the same operational amplifier.

The operational amplifiers 13a, 13b being mounted in the same way, they are adjusted so as to determine the values of the drive voltages in such a way that the potential difference established across the terminals of the photodiodes is the one desired, and is the same for all the photodiodes; this may lead to different drive voltage values VP1a, VP1b so as to compensate for any differences in voltage thresholds exhibited by the various integrated circuits 10, 11. In the non-limiting example described, the operating conditions of the operational amplifiers 13a, 13b have been adjusted, in a manner which is itself conventional, so that the potential difference established across the terminals of the photodiodes is close to 0 volts.

This version of the invention makes it possible to use several integrated circuits simultaneously for reading and biasing to the same bias voltage the photodiodes of one and the same photosensitive array. However, this version of the invention is also of major benefit even when the photodiodes are associated with a single integrated circuit, since a comparator circuit 12a, 12b has the advantage of being easily adjusted to obtain any bias value for the photodiodes.

In the non-limiting example of FIG. 5, one and the same number of photodiodes Dp1 to Dp4 cooperates with each integrated circuit 10, 11, but it is possible to devise different distributions, which depend in particular on the fabrications embodied as integrated circuits, and on the availability of integrated circuits furnished with a number of adapter amplifiers which is equal to or greater than the number of photodiodes of one and the same array to be used; not forgetting of course that in each integrated circuit an adapter amplifier must be reserved to provide the reference voltage VR.

By way of example, in the case of a photosensitive array comprising 600 photodiodes, it would be possible to use a first integrated circuit containing 512 adapter amplifiers and a second containing 128.

Of course, it is also clear that the setup described in FIG. 5 permits the use of a sizeable number of integrated circuits each containing a sizeable number of adapter amplifiers such as A1, A2, . . . , A5.

It should be observed that the manner of operation of a photosensitive array cooperating with adapter amplifiers embodied in the form of integrated circuits, as described hereinabove, is equally applicable to an image detector for detecting images contained in visible radiation as in X-ray radiation. Indeed, for one or the other case it is sufficient to take off or interpose in front of the photosensitive array, the scintillator material 71 mentioned with reference to FIG. 2.

Finally, the description has been given with reference mainly to a photodiode array, but the invention applies to any assembly containing photodiodes, and we intend the term "array" to also cover photodiode strips.

What is claimed is:

1. An image detector, comprising an array of photodiodes, plural adapter amplifiers integrated on one and the same substrate, configured to receive electric charges produced by the photodiodes, the electric charges being produced during an integration phase during which they are each biased by a bias voltage, each adapter amplifier having a first input and a second input, the bias voltage being applied to the cathode or anode of each photodiode by way of the first input of a respective adapter amplifier whose second input is linked to a drive input which is common to the plural adapter amplifiers of the same substrate and is brought to a drive voltage, and an additional adapter amplifier integrated on the same substrate, having its second input also receiving the drive voltage, and in that there is provided a circuit receiving the voltage present on the first input of the additional adapter amplifier as a reference potential and establishing between the cathodes or anodes of the photodiodes and the second inputs of the adapter amplifiers a potential difference referenced with respect to the reference potential.

2. The image detector as claimed in claim 1, further comprising a plurality of integrated circuits, wherein each integrated circuit of said plurality of integrated circuits comprises said adapter amplifiers and said additional adapter amplifier.

3. The image detector as claimed in claim 1, further comprising at least one amplifier operating as a follower amplifier, with a first input which receives the reference potential and with an output linked to the cathodes or anodes of the photodiodes.

4. The image detector as claimed in claim 3, wherein the bias voltage of the photodiodes is equal to or around 0 volts.

5. The image detector as claimed in claim 1, further comprising at least one integrated circuit associated with a comparator circuit, a first input of which receives the reference voltage delivered by the integrated circuit, and a second input of which receives a fixed voltage applied also to the cathodes or anodes of the photodiodes, the output of the comparator circuit being linked to the drive input of the integrated circuit to which it delivers a drive voltage, the output of the comparator circuit being linked to the drive input.

6. The image detector as claimed in claim 5, wherein at least two integrated circuits each comprising a group of adapter amplifiers are each associated with a comparator circuit and in that the photodiodes of at least one photosensitive array are split into at least two groups and, the photodiodes of one of the groups being linked to the adapter amplifiers of one of the integrated circuits and the photodiodes of the other group being linked to the adapter amplifiers of the other of the integrated circuits, and in that the outputs of the comparators are connected respectively to the drive inputs of the respective integrated circuits.

7. The image detector as claimed in claim 1, wherein the adapter amplifiers use amplifiers which include a single input transistor.

8. The image detector as claimed in claim 1, wherein the adapter amplifiers cooperate with an integration capacitance so as to integrate the charges delivered by the photodiodes.

9. The image detector as claimed in claim 1, designed to detect images contained in X-ray radiation, and further comprising at least one scintillator material.

* * * * *